(12) United States Patent
Ohwaki et al.

(10) Patent No.: US 8,320,701 B2
(45) Date of Patent: Nov. 27, 2012

(54) PICTURE PROCESSING APPARATUS AND METHOD

(75) Inventors: Kazuyasu Ohwaki, Kanagawa-ken (JP); Goh Itoh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1293 days.

(21) Appl. No.: 12/048,988

(22) Filed: Mar. 14, 2008

(65) Prior Publication Data

US 2008/0226191 A1   Sep. 18, 2008

(30) Foreign Application Priority Data

Mar. 16, 2007   (JP) ................ P2007-069516

(51) Int. Cl.
| | |
|---|---|
| G06K 9/38 | (2006.01) |
| G06K 9/40 | (2006.01) |
| G06K 9/42 | (2006.01) |
| G06K 9/44 | (2006.01) |
| G09G 1/14 | (2006.01) |
| G09G 5/00 | (2006.01) |

(52) U.S. Cl. ........ 382/274; 382/260; 382/264; 382/275; 345/20; 345/611

(58) Field of Classification Search ............ 382/260, 382/264, 266, 274, 275; 345/611, 20
See application file for complete search history.

(56) References Cited

U.S. PATENT DOCUMENTS

| | | | | |
|---|---|---|---|---|
| 6,807,316 B2 * | 10/2004 | Enomoto | .......... | 382/264 |
| 7,127,122 B2 * | 10/2006 | Ogata et al. | .......... | 382/260 |
| 7,570,833 B2 * | 8/2009 | Lee | .......... | 382/260 |
| 7,590,303 B2 * | 9/2009 | Lee et al. | .......... | 382/274 |
| 7,778,478 B2 * | 8/2010 | Kuniba | .......... | 382/254 |
| 2005/0089239 A1 * | 4/2005 | Brajovic | .......... | 382/266 |

FOREIGN PATENT DOCUMENTS

| | | |
|---|---|---|
| JP | 2003-008935 | 1/2003 |
| JP | 2005-301910 | 10/2005 |

OTHER PUBLICATIONS

Ogata et al., "Dynamic Range Compression Based on Illumination Compensation", IEEE Transactions on Consumer Electronics, vol. 47 No. 3, Aug. 2001, pp. 548-558.*
U.S. Appl. No. 12/056,105, filed Mar. 26, 2008, to Ohwaki et al.

* cited by examiner

*Primary Examiner* — Matthew Bella
*Assistant Examiner* — Jose M Torres
(74) *Attorney, Agent, or Firm* — Finnegan, Henderson, Farabow, Garrett & Dunner, L.L.P.

(57) ABSTRACT

A smoothing filter generates a smoothed picture by smoothing a brightness component of an input picture. An adjustment filter generates an adjusted picture by applying a filter to an area of the input picture. The filter has the same characteristic as the smoothing filter. The area has a brightness matched with a predetermined condition of noise detection. A contrast component calculation unit calculates a contrast component of the input picture by dividing each pixel value of the adjusted picture with a corresponding pixel value of the smoothed picture. An output picture generation unit generates an output picture by multiplying the smoothed picture with the contrast component.

10 Claims, 13 Drawing Sheets

| 0.075 | 0.125 | 0.075 |
| --- | --- | --- |
| 0.125 | 0.2 | 0.125 |
| 0.075 | 0.125 | 0.075 |

FIG. 3

| 0.111 | 0.111 | 0.111 |
| --- | --- | --- |
| 0.111 | 0.112 | 0.111 |
| 0.111 | 0.111 | 0.111 |

FIG. 4

CENTER PIXEL

PICTURE PROCESSING APPARATUS AND METHOD

CROSS-REFERENCE TO RELATED APPLICATIONS

This application is based upon and claims the benefit of priority from prior Japanese Patent Application No. 2007-069516, filed on Mar. 16, 2007; the entire contents of which are incorporated herein by reference.

FIELD OF THE INVENTION

The present invention relates to a picture processing apparatus and a method for generating a picture having enhanced or compressed contrast.

BACKGROUND OF THE INVENTION

As a technique to compress a dynamic range, a picture is separated to an illumination component and a reflection component (Hereafter, it is called "a contrast component"), and the illumination component is compressed. A method for compressing the dynamic range with high contrast is known.

When separating a picture into an illumination component and a reflection component, as shown in FIG. 1, a brightness blur (Hereafter, it is called "a halo") often occurs at a boundary of an object in the picture. In order to reduce the halo, various methods are proposed at the present.

For example, in JP-A 2003-8935 (Kokai), an epsilon filter (non-linear filter) having a superior ability to preserve edges is used as the filter for separating the illumination component. By controlling a threshold for the epsilon filter, a boundary of the object is suitably extracted. As a result, occurrence of the halo is reduced.

However, in the method for processing signal by separating the picture into the illumination component and the contrast component, if the picture includes noise in addition to the halo, the noise is preserved with enhancement in the picture.

In order to reduce the noise, after subjecting a noise reduction processing to an input picture, the input picture is separated into the illumination component and the contrast component. However, in this case, a signal component is not sufficiently separated from a noise component in the input picture, and a contrast in the signal component is further reduced.

SUMMARY OF THE INVENTION

The present invention is directed to a picture processing apparatus and a method for generating a picture with high visibility by controlling extraction of a contrast component according to characteristics of the input picture.

According to an aspect of the present invention, there is provided an apparatus for processing a picture, comprising: a first smoothing filter configured to generate a first smoothed picture by smoothing a brightness component of an input picture; an adjustment filter configured to generate an adjusted picture by applying a filter to an area of the input picture, the filter having the same characteristic as the first smoothing filter, the area having a brightness matched with a predetermined condition of noise detection; a contrast component calculation unit configured to calculate a contrast component of the input picture by dividing each pixel value of the adjusted picture with a corresponding pixel value of the first smoothed picture; and an output picture generation unit configured to generate an output picture by multiplying the first smoothed picture with the contrast component.

According to another aspect of the present invention, there is also provided an apparatus for processing a picture, comprising: a first smoothing filter configured to generate a first smoothed picture by smoothing a brightness component of an input picture; an adjustment filter configured to generate an adjusted picture by applying a filter to an area of the input picture, the filter having the same characteristic as the first smoothing filter, the area having a brightness matched with a predetermined condition of noise detection; a contrast component calculation unit configured to calculate a contrast component of the input picture by dividing each pixel value of the adjusted picture with a corresponding pixel value of the first smoothed picture; a second smoothing filter configured to generate a second smoothed picture by selectively smoothing an edge component of the input picture weaker than a predetermined condition; and an output picture generation unit configured to generate an output picture by multiplying the second smoothed picture with the contrast component.

According to still another aspect of the present invention, there is also provided an apparatus for processing a picture, comprising: a first smoothing filter configured to generate a first smoothed signal by smoothing a brightness of an area of an input picture; an adjustment filter configured to generate an adjusted signal by maintaining the brightness of the area if the brightness is not within a range of a predetermined brightness, and to generate an adjusted signal by replacing the brightness of the area with the predetermined brightness if the brightness is within the range; a contrast component calculation unit configured to calculate a contrast component of the input picture by dividing the input picture with the adjusted signal; and a picture composition unit configured to generate a composed picture by multiplying the first smoothed signal with the contrast component signal.

BRIEF DESCRIPTION OF THE DRAWINGS

FIG. 3 is a schematic diagram of one example of "3×3" Gaussian filter.

FIG. 4 is a schematic diagram of one example of "3×3" average filter.

DETAILED DESCRIPTION OF THE EMBODIMENTS

Figure 1:
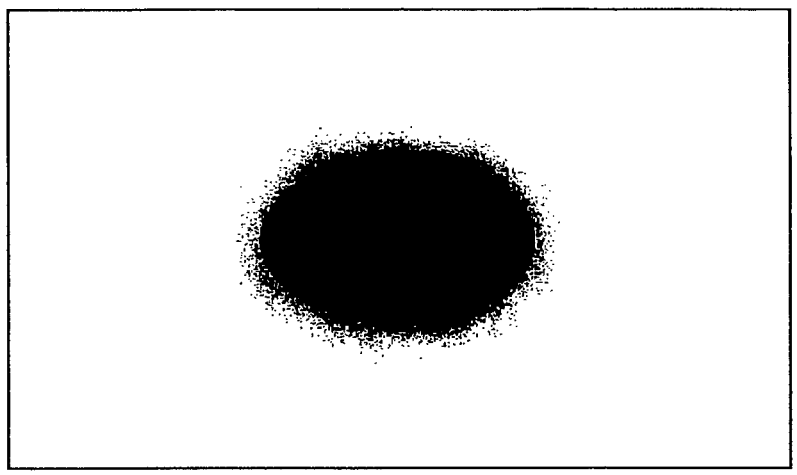
FIG. 1 is a schematic diagram of one example of a halo.

Hereinafter, various embodiments of the present invention will be explained by referring to the drawings. The present invention is not limited to the following embodiments.

(The First Embodiment)

A picture processing apparatus 10 of the first embodiment is a contrast enhancement picture processing apparatus. The picture processing apparatus 10 is explained by referring to FIGS. 2~7.

(1) Units of the Picture Processing Apparatus 10

Figure 2:
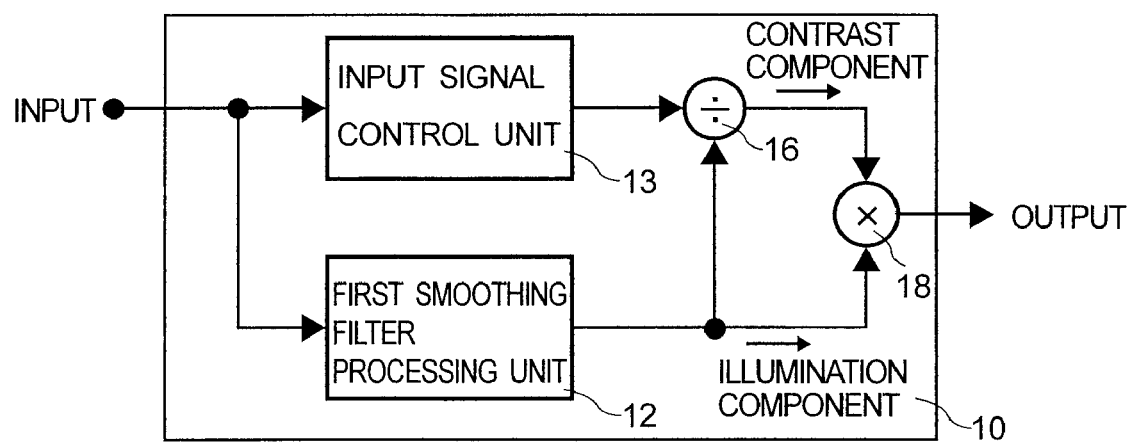
FIG. 2 is a block diagram of the picture processing apparatus according to a first embodiment.

FIG. 2 is a block diagram of the picture processing apparatus 10 according to the first embodiment. The picture processing apparatus 10 includes a first smoothing filter processing unit 12, an input signal control unit 13, a divider 16 (a contrast component calculation unit 16), and a multiplier 18 (an image composition unit 18).

As shown in FIG. 2, an output signal from the contrast component calculation unit 16 is a contrast component, and an output signal from the first smoothing filter processing unit 12 is an illumination component. Hereafter, function of each unit 12~16 is explained in order.

(2) The First Smoothing Filter Processing Unit 12

The first smoothing filter processing unit 12 superimposes a smoothing filter onto an input picture (an input signal via an input unit), and generates a first smoothing processed signal.

A smoothing filter used by the first smoothing processing unit 12 is, for example, a "3×3" Gaussian filter having coefficients shown in FIG. 3, or a "3×3" average filter having coefficients shown in FIG. 4.

Figure 5:
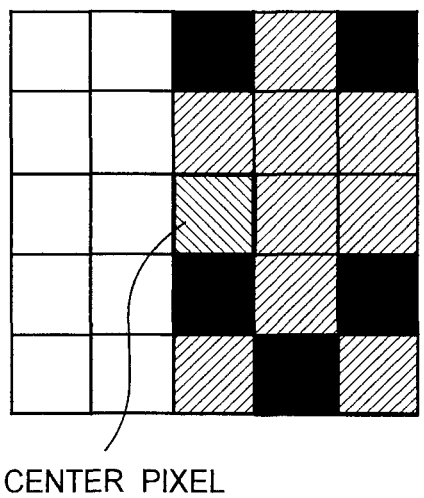
FIG. 5 is one example of pixels before smoothing processing by the epsilon filter.
Figure 6:
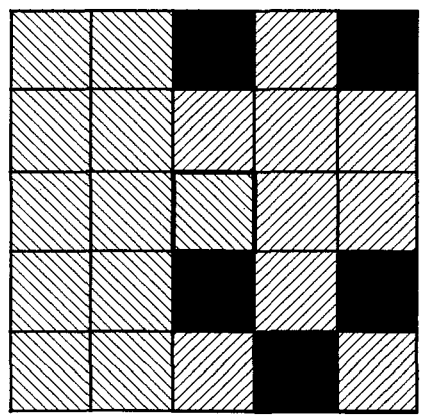
FIG. 6 is one example of the pixels after smoothing processing by the epsilon filter.
Figure 7:
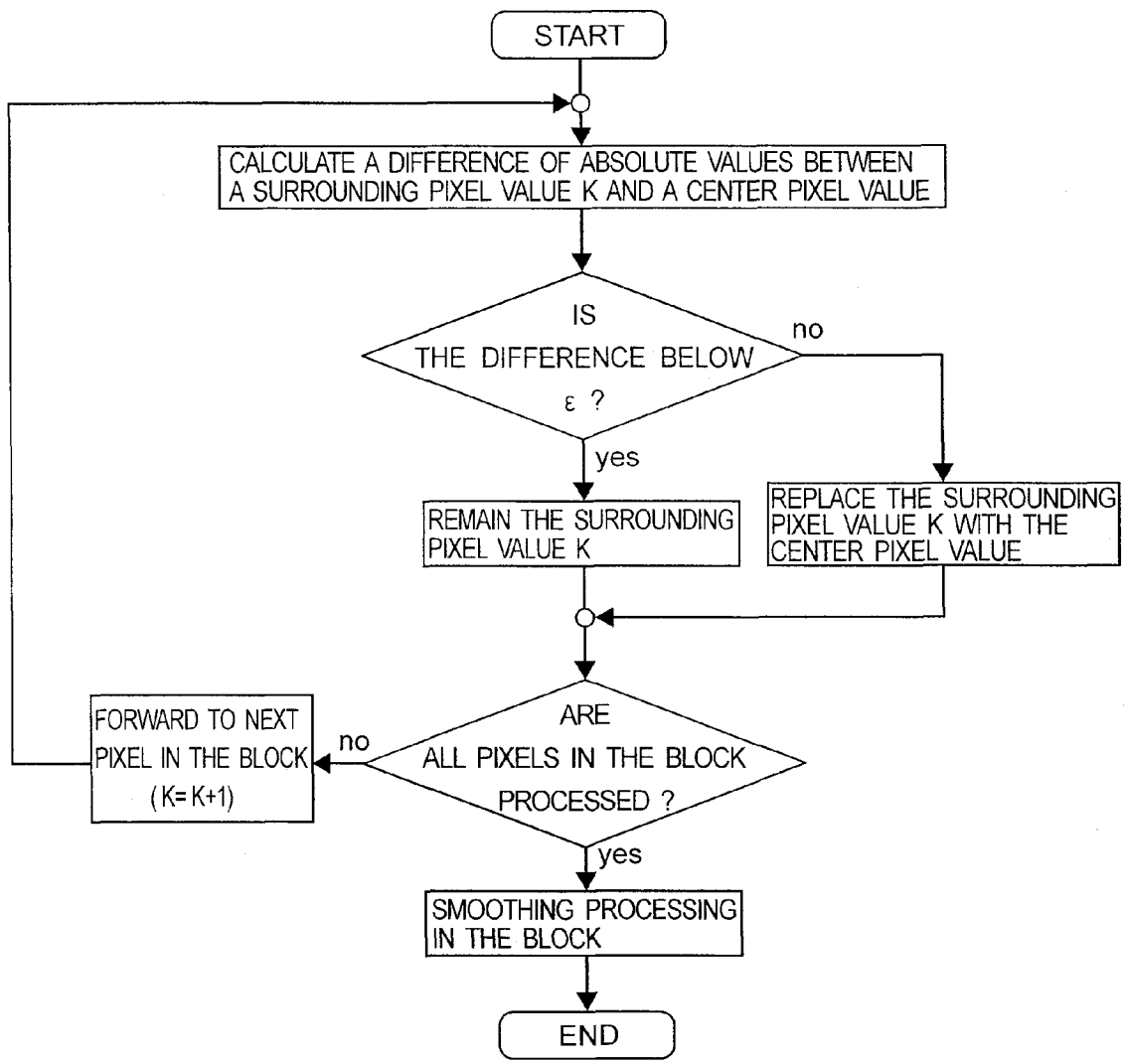
FIG. 7 is a flow chart of processing of the epsilon filter.

Furthermore, a non-linear low-pass filter of edge preserve may be used. As an example of this filter, an epsilon filter is explained by referring to FIGS. 5~7. FIG. 5 shows one example of pixels before smoothing processing by the epsilon filter. FIG. 6 shows one example of the pixels after smoothing processing by the epsilon filter. FIG. 7 is a flow chart of processing of the epsilon filter.

As to the epsilon filter, a difference of absolute value between a center pixel value and each surrounding pixel value in a block to be filtered is calculated. If the difference is below a threshold (Hereafter, it is called E value), the surrounding pixel value is maintained. If the difference is above the threshold, the surrounding pixel value is replaced with the center pixel value.

FIG. 5 shows a block having kernel size "5×5" to be filtered. As shown in FIG. 5, a center pixel value is gray, a surrounding pixel value is white, gray, or black, a difference between the center pixel value and the surrounding pixel value (black) is below $\epsilon$, and a difference between the center pixel value and the surrounding pixel value (white) is above $\epsilon$. In case of epsilon filter processing, as shown in FIG. 6, the surrounding pixel value (white) is replaced with the center pixel value (gray) while the surrounding pixel value (black) is maintained as it is. In the first embodiment, the epsilon filter is used as the first smoothing processing unit 12.

(3) The Input Signal Control Unit 13

The input signal control unit 13 controls the input signal so that an output signal has the same characteristic as an output signal from the first smoothing filter processing unit 12 based on the input signal.

For example, if a characteristic of a noise signal value is previously known from a characteristic of an input device, it is decided whether the input signal satisfies a predetermined condition to detect noise. In case of satisfying the condition, the input signal is regarded as noise, and the same processing as the first smoothing filter processing unit is executed on the input signal. In case of not satisfying the condition, the input signal is not regarded as noise, and processing different from the first smoothing filter processing unit is executed on the input signal, and an adjustment signal is output.

For example, if a notice pixel (a center pixel) has a different brightness over a predetermined reference in comparison with a brightness of each surrounding pixel, the input signal control unit 13 decides the notice pixel is an impulse noise. Furthermore, as the processing different from the first smoothing filter, the input signal may be output (through) as it is.

(4) The Contrast Component Calculation Unit 16

The contrast component calculation unit 16 is a divider, and extracts a contrast component of the input picture. As an example of extraction of the contrast component, a high spatial frequency component is extracted.

Usually, by smooth filter processing to the input picture, a low spatial frequency component is extracted. Accordingly, by subtracting the low spatial frequency component from the input picture, the high spatial frequency component is obtained.

In the first embodiment, as shown in FIG. 2, by dividing an adjustment signal (from the input signal control unit 13) with a first smoothing signal (from the first smoothing filter processing unit 12), a contrast component signal is extracted.

(5) The Picture Composition Unit 18

The picture composition unit 18 is a multiplier, and generates an output picture by compounding a contrast component signal with an illumination component signal. In the first embodiment, as shown in FIG. 2, the output picture is generated by multiplying the contrast component signal with the first smoothing signal.

(6) Effect

In the picture processing apparatus 10 of the first embodiment, if the input signal is noise, the input signal control unit 13 outputs the adjustment signal equal to the first smoothing signal. In this case, a contrast component signal (from the divider 16) is "1". In other words, if the contrast component signal is "1", an illumination component signal is "(the contrast component signal)×(the illumination component signal)", i.e., the output signal is equal to the illumination component signal. Briefly, the contrast component is not extracted.

Accordingly, if the input signal includes noise, the noise extracted as the contrast component can be removed. Furthermore, the noise is often extracted as the contrast component from the illumination component. As a result, the noise can be reduced. The noise extracted as the illumination component is a low frequency noise. The low frequency noise is not conspicuous in comparison with a high frequency noise extracted as the contrast component.

In this way, only if the input signal is noise, the input signal is controlled so that the output signal has the same characteristic as an output signal from the first smoothing filter processing unit. As a result, the noise only can be removed.

(Embodiment 2-1)

A picture processing apparatus 10 of embodiment 2-1 is a contrast enhancement picture processing apparatus. The picture processing apparatus 10 is explained by referring to FIG. 8.

Figure 8:
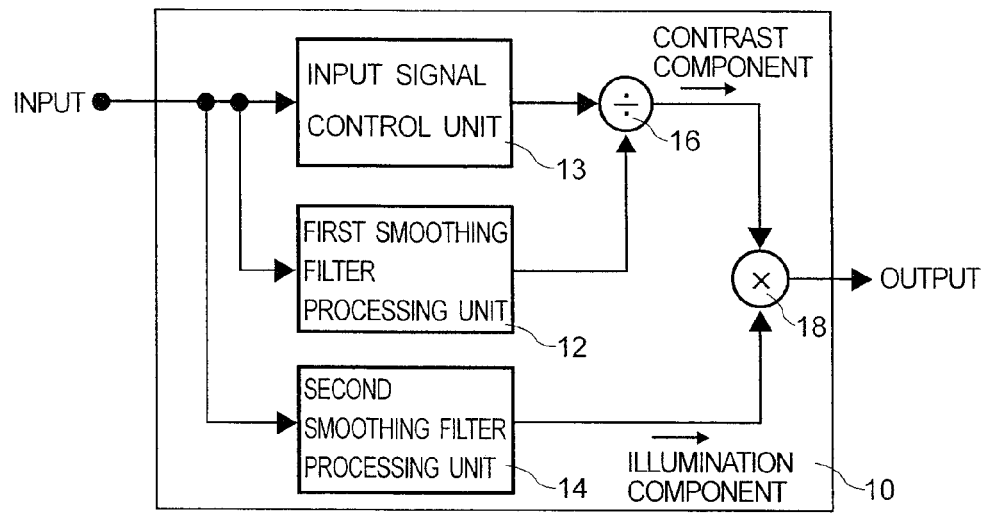
FIG. 8 is a block diagram of the picture processing apparatus according to a second embodiment.

FIG. 8 is a block diagram of the picture processing apparatus 10 according to embodiment 2-1. The picture processing apparatus 10 includes the first smoothing filter processing unit 12, the input signal control unit 13, a second smoothing processing unit 14, the contrast component calculation unit 16, and the image composition unit 18.

In the present embodiment, as shown in FIG. 8, an output signal from the contrast component calculation unit 16 is a contrast component, and an output signal from the second smoothing filter processing unit 14 is an illumination component.

As a different feature from the first embodiment, two different filters are used to separate the input picture into the contrast component and the illumination component. As shown in FIG. 8, the picture composition unit 18 generates an output picture by multiplying a contrast component signal with a second smoothing signal.

The filter for extracting a contrast component (used by the first smoothing filter processing unit 12) is a smoothing filter for not preserving an edge element. For example, "3×3" Gaussian filter having coefficients shown in FIG. 3, or "3×3" average filter having coefficients shown in FIG. 4 is used.

The filter for extracting an illumination component (used by the second smoothing filter processing unit 14) is a smoothing filter for preserving an edge element. For example, a non-linear low-pass filter of edge preserve, i.e., an epsilon filter is used. Furthermore, other filter (a rank-order filter such as a median filter, an alpha trimmed average filter, a filter based on order statistics such as robust estimation, a bilateral filter, a trilateral filter) may be used.

In embodiment 2-1, a picture having less noise and an enhanced contrast is generated without a halo.

(Embodiment 2-2)

Embodiment 2-2 relates to the input signal control unit 13 used for the first embodiment and embodiment 2-1.

(1) The Input Signal Control Unit 13

In embodiment 2-2, the input signal control unit 13 controls the input signal so that an output signal has the same characteristic as an output signal from the first smoothing filter processing unit 12 based on the input signal.

For example, assume that a brightness level of an input signal is represented as eight bits (0~255). If the brightness level is 0~33 (the brightness level is low and dark), the same processing as the first smoothing filter processing unit 12 is subject to the input signal. If the brightness level is 31~255 (the brightness level is high and bright), processing different from the first smoothing filter processing unit 12 is subjected to the input signal, and an adjustment signal is output. Processing different from the first smoothing filter processing unit 12 may be through (output) the input signal.

(2) Effect

In the picture processing apparatus 10 of the present embodiment, if the brightness level of the input signal is 0~30 (dark), the adjustment signal is equal to the first smoothing signal. In this case, a contrast component signal (from the divider 16) is "1". Briefly, the contrast component is not extracted. In other words, if the contrast component signal is "1", an illumination component signal is "(the contrast component signal)×(the illumination component signal)", i.e., the output signal is equal to the illumination component signal. As a result, the contrast component is not extracted.

Accordingly, if a noise is included in an area having brightness level 0~30 (dark) of the input signal, the noise extracted as the contrast component can be removed. Furthermore, the noise is often extracted as the contrast component from the illumination component. As a result, the noise can be reduced. The noise extracted as the illumination component is a low frequency noise. The low frequency noise is not conspicuous in comparison with a high frequency noise extracted as the contrast component.

(The Third Embodiment)

A picture processing apparatus 10 of the third embodiment is a contrast enhancement picture processing apparatus. The picture processing apparatus 10 is explained by referring to FIGS. 9 and 10.

Figure 9:
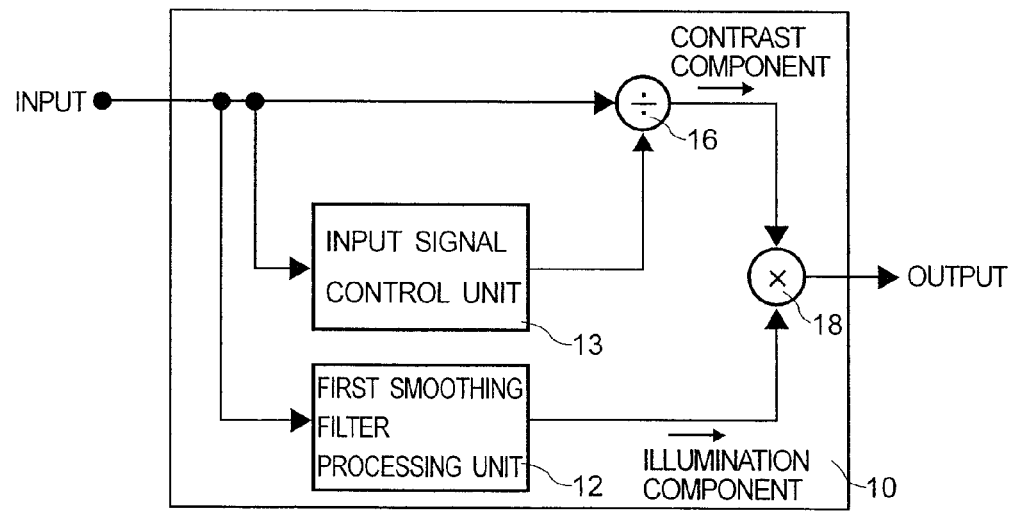
FIG. 9 is a block diagram of the picture processing apparatus according to a third embodiment.

FIG. 9 is a block diagram of the picture processing apparatus 10 according to the third embodiment. The picture processing apparatus 10 includes the first smoothing filter processing unit 12, the input signal control unit 13, the contrast component calculation unit 16, and the image composition unit 18.

As shown in FIG. 9, an output signal from the contrast component calculation unit 16 is a contrast component, and an output signal from the first smoothing filter processing unit 12 is an illumination component.

In the third embodiment, the input signal control unit 13 outputs an adjustment signal based on the input signal so that the adjustment signal has the same characteristic as the input signal. By dividing the input signal with the adjustment signal, a contrast component of the picture is obtained.

Figure 10:
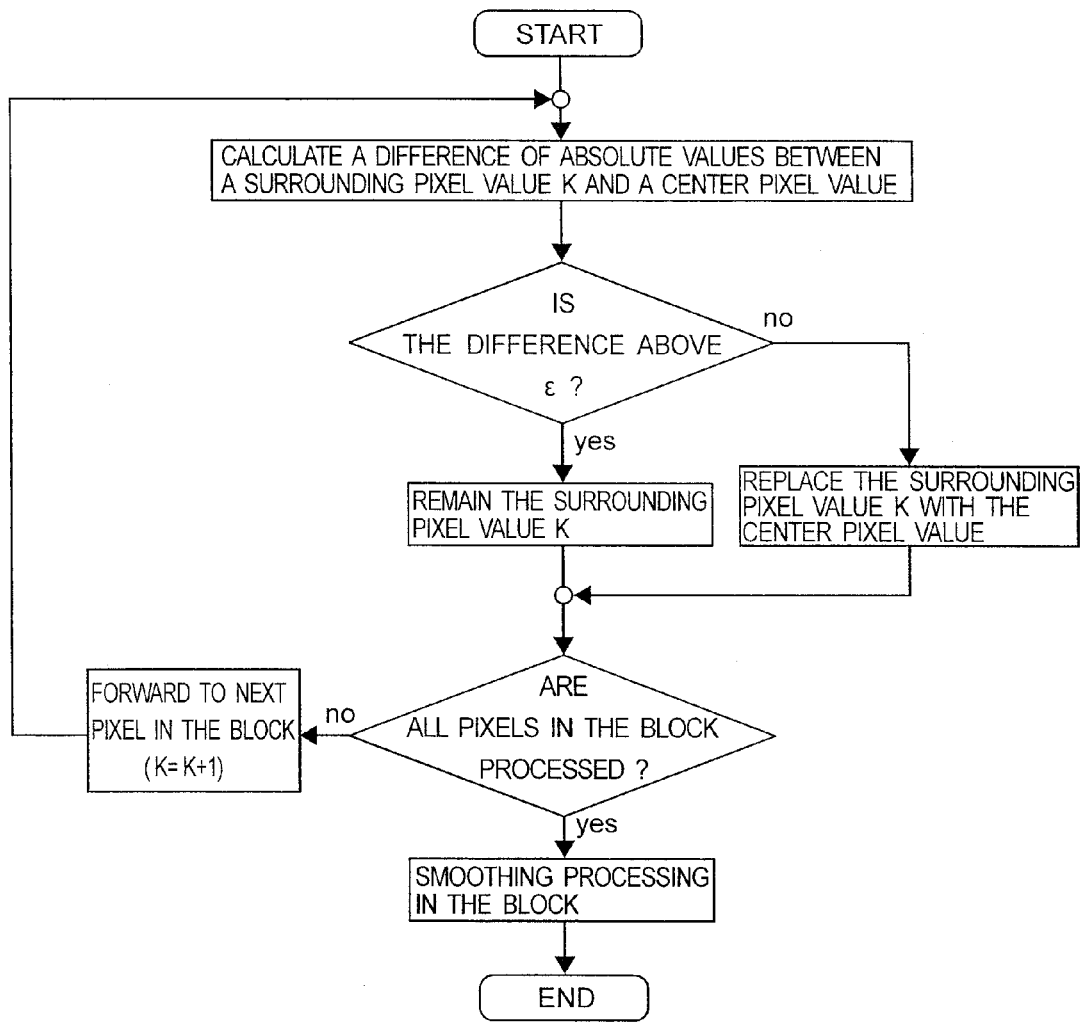
FIG. 10 is a flow chart of processing of a deformation epsilon filter.

For example, the input signal control unit 13 uses a deformation epsilon filter having processing shown in FIG. 10. As to the deformation epsilon filter, a difference of absolute value between a center pixel value and each surrounding pixel value in a block to be filtered is calculated. If the difference is above a threshold (It is called $\epsilon$ value), the surrounding pixel value is maintained. If the difference is below the threshold, the surrounding pixel value is replaced with the center pixel value.

In the third embodiment, the same effect as the second embodiment is obtained. In comparison with the second embodiment, one filter processing unit is unnecessary, and operation cost can be further reduced.

(The Fourth Embodiment)

The fourth embodiment relates to the input signal control unit 13 of the first, second, and third embodiments.

In the fourth embodiment, the input signal control unit 13 raises a ratio so that an output signal has the same characteristic as an output signal from the first smoothing filter processing unit 12 if a brightness of the input signal is low (dark). In this case, the lower the brightness of the input signal is, the higher the ratio is.

For example, assume that a brightness level of an input signal is represented as eight bits (0~255). If the brightness level is 0~30 (the brightness level is low and dark) the same processing as the first smoothing filter processing unit 1 is subjected to the input signal. If the brightness level is 31~255 (the brightness level is high and bright), the input signal is output as it is. In the fourth embodiment, characteristic that a dark area includes conscious noise compared with a bright area is used. Briefly, the dark area is controlled not to extract a contrast component including noise.

For example, in the second embodiment, if the first smoothing filter processing unit 12 uses an average filter, the input signal control unit 13 is set as an epsilon filter. In this case, an epsilon value of the dark area is high, while the epsilon value of the bright area is low. The fourth embodiment is also realized under this construction.

(The Fifth Embodiment)

The fifth embodiment relates to the input signal control unit 13 of the first, second, and third embodiments.

In the fifth embodiment, the input signal control unit 13 controls the input signal so that characteristic of the output signal becomes near characteristic of an output signal from the first smoothing filter processing unit 12 if a brightness of the input signal is low (dark). In this case, the lower the brightness of the input signal is, the nearer the characteristic of the output signal is. For example, if the input signal is darker, a smoothing degree is linearly or non-linearly raised. In case of a brightness level 0 of the input signal, characteristic of the output signal is equal to characteristic of an output signal from the first smoothing filter processing unit 12.

In the fifth embodiment, characteristic that a dark area includes conscious noise compared with a bright area is used. Briefly, the dark area is controlled not to extract a contrast component including noise.

(Embodiment 6-1)

A picture processing apparatus 10 of embodiment 6-1 is a contrast enhancement picture processing apparatus. The picture processing apparatus 10 is explained by referring to FIGS. 11, 17, and 18.

(1) Units of the Picture Processing Apparatus 10

Figure 11:
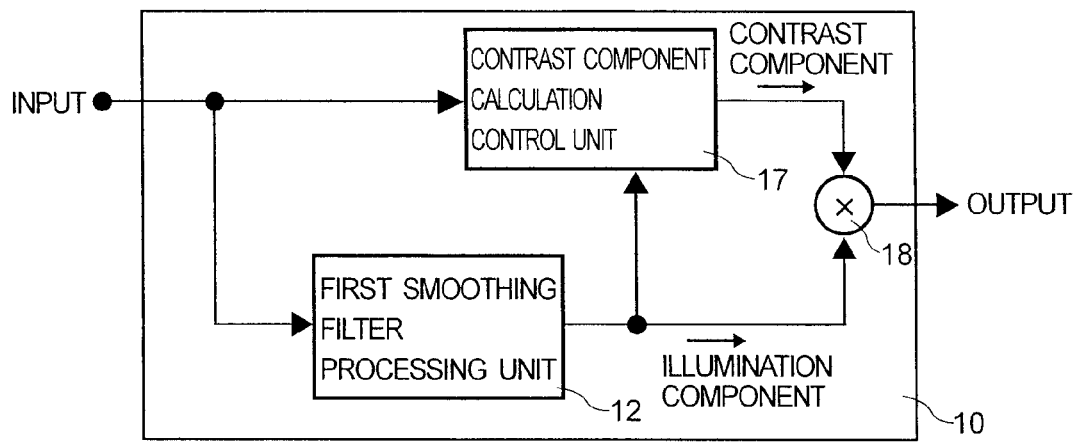
FIG. 11 is a block diagram of the picture processing apparatus according to an embodiment 6-1.
Figure 17:
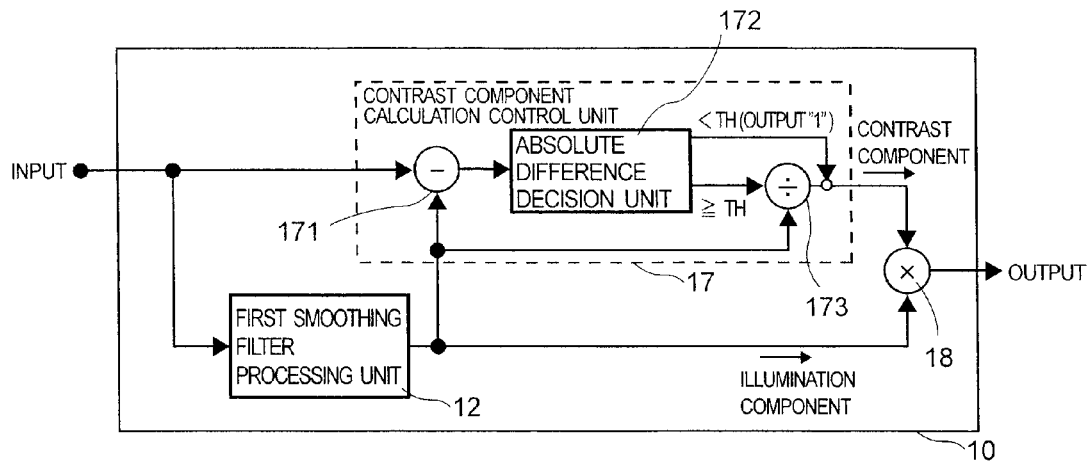
FIG. 17 is a detail block diagram of the picture processing apparatus according to the embodiment 6-1.
Figure 18:
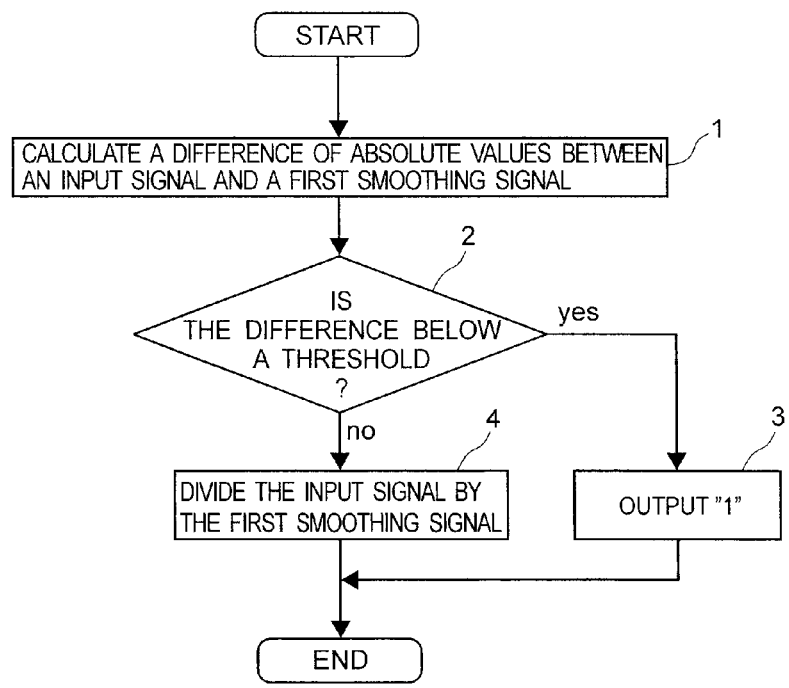
FIG. 18 is a flow chart of processing of the picture processing apparatus according to the embodiment 6-1.

FIG. 11 is a simple block diagram of the picture processing apparatus 10, and FIG. 17 is a detailed block diagram of the picture processing apparatus 10 according to embodiment 6-1.

The picture processing apparatus 10 includes the first smoothing filter processing unit 12, a contrast component calculation control unit 17, and the image composition unit 18.

As shown in FIGS. 11 and 17, an output signal from the contrast component calculation control unit 17 is a contrast component, and an output signal from the first smoothing filter processing unit 12 is an illumination component.

(2) The Contrast Component Calculation Control Unit 17

As shown in FIG. 17, the contrast component calculation control unit 17 includes a subtractor 171, an absolute difference decision unit 172, and a divider 173. Processing of the contrast component calculation control unit 17 is explained by referring to FIG. 18.

At step 1, the subtractor 171 calculates a difference of absolute values between a brightness of each pixel of the input signal and a brightness of a corresponding pixel of the first smoothing signal.

At step 2, the absolute difference decision unit 172 decides whether the difference of absolute values of each pixel is below a threshold.

At step 3, if the difference is below the threshold, a contrast component signal "1" is output for the pixel.

As step 4, if the difference is not below the threshold, the divider 173 divides a brightness of the pixel of the input signal by the first smoothing signal of the corresponding pixel, and outputs a contrast component signal of the pixel.

(3) Effect

In the present embodiment, by this controlling, a clear picture with regular noise removed and minute noises smoothed can be generated.

(Modification 1)

If a brightness level of an input signal is 0~30, a contrast component signal "1" is output. If the brightness level of the input signal is 31~255, the input signal is output as it is.

Furthermore, if a signal value of noise is previously known, when the input signal is decided as the noise, the contrast component signal "1" may be output.

In embodiment 6-1, if the input signal is noise or if a difference of absolute values between the input signal and the first smoothing signal is very low, the contrast component signal "1" is output.

(Embodiment 6-2)

A picture processing apparatus 10 of embodiment 6-2 is a contrast enhancement picture processing apparatus. The picture processing apparatus 10 is explained by referring to FIGS. 19 and 18.

(1) Units of the Picture Processing Apparatus 10

Figure 19:
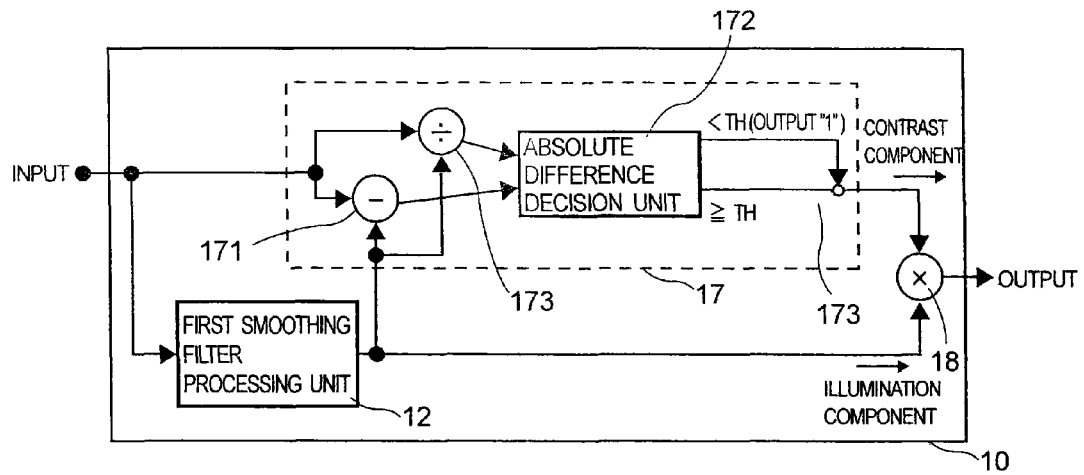
FIG. 19 is a block diagram of the picture processing apparatus according to an embodiment 6-2.

FIG. 19 is a block diagram of the picture processing apparatus 10 according to embodiment 6-2. The picture processing apparatus 10 includes the first smoothing filter processing unit 12, the contrast component calculation control unit 17, and the image composition unit 18.

As shown in FIG. 19, an output signal from the contrast component calculation control unit 17 is a contrast component, and an output signal from the first smoothing filter processing unit 12 is an illumination component.

(2) The Contrast Component Calculation Control Unit 17

Figure 20:
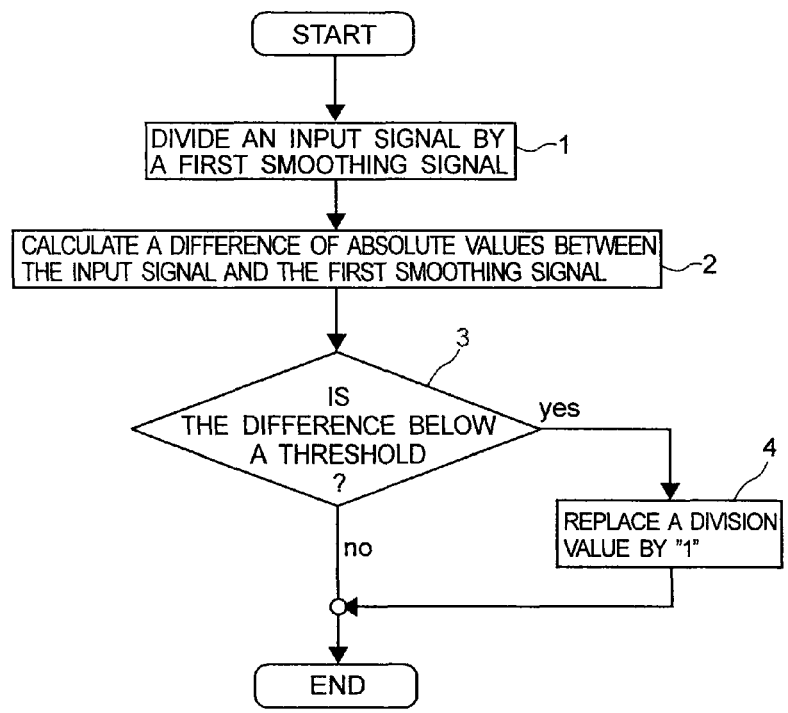
FIG. 20 is a flow chart of processing of the picture processing apparatus according to the embodiment 6-2.

As shown in FIG. 19, the contrast component calculation control unit 17 includes the subtractor 171, the absolute difference decision unit 172, and the divider 173. Feature of the present embodiment different from embodiment 6-1 is the location of the divider 173. Processing of the contrast component calculation control unit 17 is explained by referring to FIG. 20.

At step 1, the divider 173 divides a brightness of each pixel of the input signal by a brightness of a corresponding pixel of the first smoothing signal, and outputs a contrast component signal as the division result.

At step 2, the subtractor 171 calculates a difference of absolute values between a brightness of each pixel of the input signal and a brightness of the corresponding pixel of the first smoothing signal.

At step 3, the absolute difference decision unit 172 decides whether the difference of absolute values of each pixel is below a threshold.

As step 4, if the difference is below the threshold, a contrast component signal "1" is output for the pixel. If the difference is not below the threshold, the contrast component signal from the divider 173 is output.

(3) Effect

In the present embodiment, by this controlling, a clear picture that regular noises are removed and minute noises are smoothed can be generated.

(The Seventh Embodiment)

A picture processing apparatus 10 of the seventh embodiment is a contrast enhancement picture processing apparatus. The picture processing apparatus 10 is explained by referring to FIG. 12.

Figure 12:
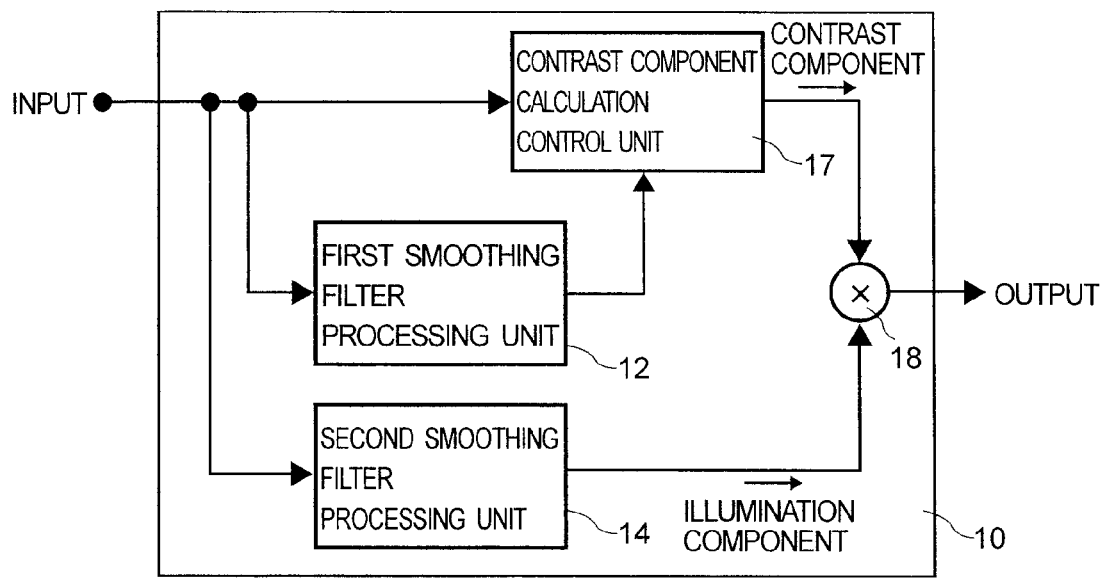
FIG. 12 is a block diagram of the picture processing apparatus according to a seventh embodiment.

FIG. 12 is a block diagram of the picture processing apparatus 10 according to the seventh embodiment. The picture processing apparatus 10 includes the first smoothing filter processing unit 12, the second smoothing filter processing unit 14, the contrast component calculation control unit 17, and the image composition unit 18.

As shown in FIG. 12, an output signal from the contrast component calculation control unit 17 is a contrast component, and an output signal from the second smoothing filter processing unit 14 is an illumination component.

As a different feature from the sixth embodiment, two different filters are used to separate the input picture to the contrast component and the illumination component. As shown in FIG. 12, the picture composition unit 18 generates an output picture by multiplying a contrast component signal with a second smoothing signal.

For example, the filter for extracting a contrast component (used by the first smoothing filter processing unit 12) is a smoothing filter able to further extract the contrast component. The filter for extracting an illumination component (used by the second smoothing filter processing unit 14) is a smoothing filter for preserving an edge component. These two smoothing filters 12 and 14 are the same as in the second embodiment.

In the seventh embodiment, an output picture having less noise and an enhanced contrast is generated without occurrence of a halo.

(The Eighth Embodiment)

The eighth embodiment relates to a modification of the contrast component calculation control unit 17 of the sixth and seventh embodiments. In the eighth embodiment, a contrast component signal is controlled so that the contrast component signal becomes near "1" if a brightness of the input signal is lower (darker).

Concretely, the input signal is supplied to the absolute difference decision unit 172 of the contrast component calculation control unit 17. A threshold to decide a difference of absolute values is changed based on a brightness of each pixel of the input signal. For example, if the brightness is below a predetermined reference (i.e., dark), the threshold is set as a large value A1. If the brightness is above the predetermined reference (i.e., bright), the threshold is set as a small value A2 (A1>A2).

In the eighth embodiment, characteristic that a dark area includes conscious noise compared with a bright area is used. Briefly, the dark area is controlled not to extract a contrast component including noise.

(The Ninth Embodiment)

The ninth embodiment relates to a modification of the contrast component calculation control unit 17 of the sixth and seventh embodiments. In the ninth embodiment, a contrast component signal is controlled so that the contrast component signal becomes near "1" if a brightness of the input signal is lower (darker).

Figure 23:
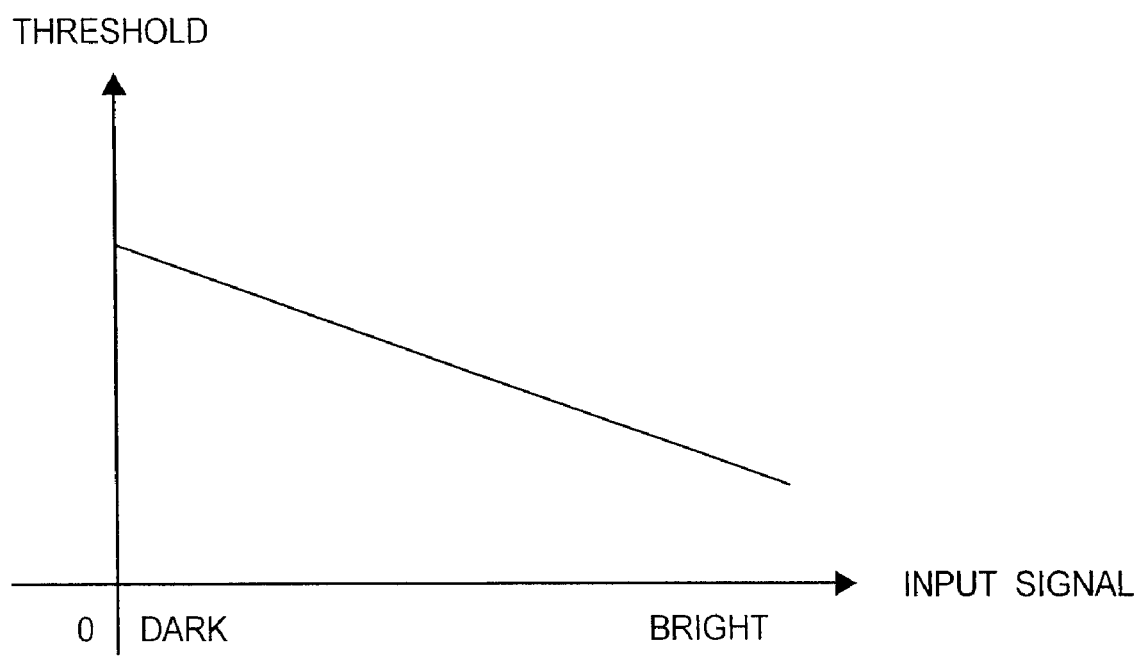
FIG. 23 is a graph representing relationship between an input signal and a threshold.

For example, the input signal is supplied to the absolute difference decision unit 172 of the contrast component calculation control unit 17. A threshold to decide a difference of absolute values is changed based on a brightness of each pixel of the input signal. For example, as shown in FIG. 23, the lower (the darker) the brightness of the pixel is, the higher the threshold for the pixel is.

In the ninth embodiment, characteristic that a dark area includes conscious noise compared with a bright area is used. Briefly, the dark area is controlled not to extract a contrast component including noise.

(The Tenth Embodiment)

A picture processing apparatus 10 of the tenth embodiment is a contrast enhancement picture processing apparatus. The picture processing apparatus 10 is explained by referring to FIG. 13.

Figure 13:
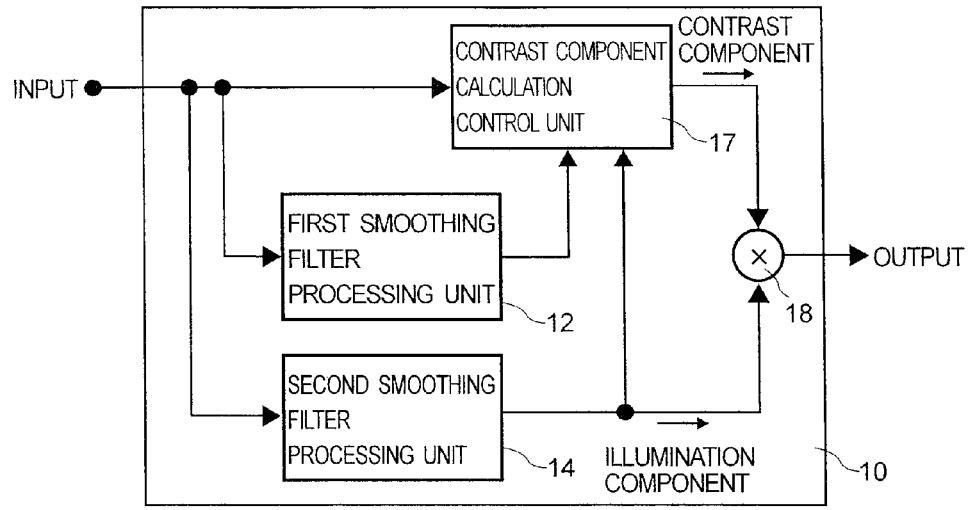
FIG. 13 is a block diagram of the picture processing apparatus according to an eighth embodiment.

FIG. 13 is a block diagram of the picture processing apparatus 10 according to the seventh embodiment. The picture processing apparatus 10 includes the first smoothing filter processing unit 12, the second smoothing filter processing unit 14, the contrast component calculation control unit 17, and the image composition unit 18.

In the ninth embodiment, a threshold of the absolute difference decision unit 172 is changed based on a brightness of the input signal. However, in the tenth embodiment, based on a second smoothing signal from the second smoothing filter processing unit 14 (filter for extracting an illumination component), the threshold of the absolute difference decision unit 172 is changed.

For example, in addition to the input signal and the first smoothing signal (from the first smoothing filter processing unit 12), the contrast component calculation control unit 17 changes the threshold based on the second smoothing signal (from the second smoothing filter processing unit 14). This change method is the same as in the eighth and ninth embodiments. Furthermore, two smoothing filters 12 and 14 are the same as in the second embodiment.

Figure 21:
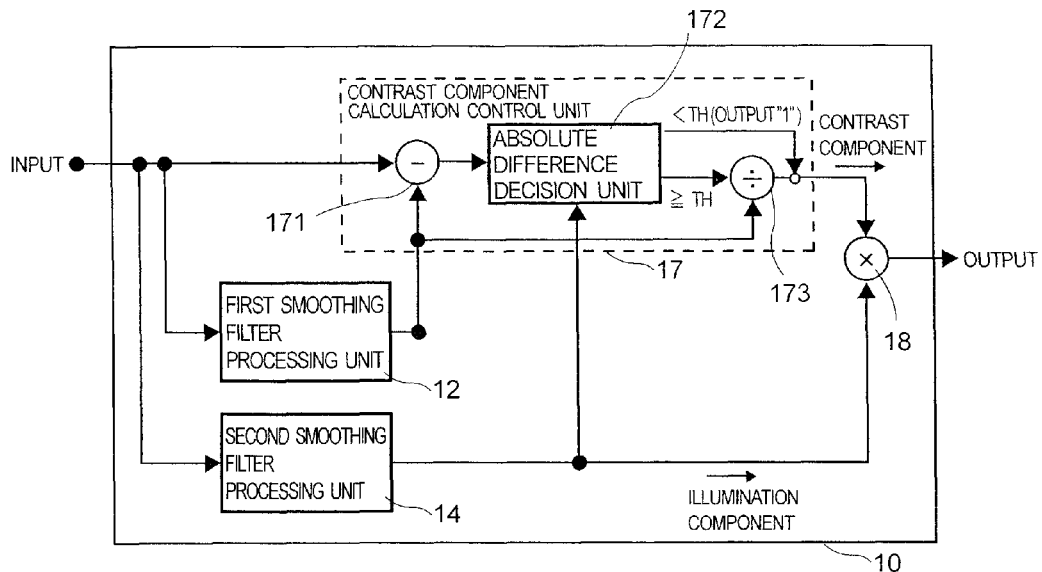
FIG. 21 is a block diagram of the picture processing apparatus according to a first modification of the tenth embodiment.

As shown in FIG. 21, the tenth embodiment may be applied to the block diagram of FIG. 17 of embodiment 6-1. Briefly, the second smoothing filter processing unit 14 is added to the block diagram of FIG. 17 of embodiment 6-1.

Figure 22:
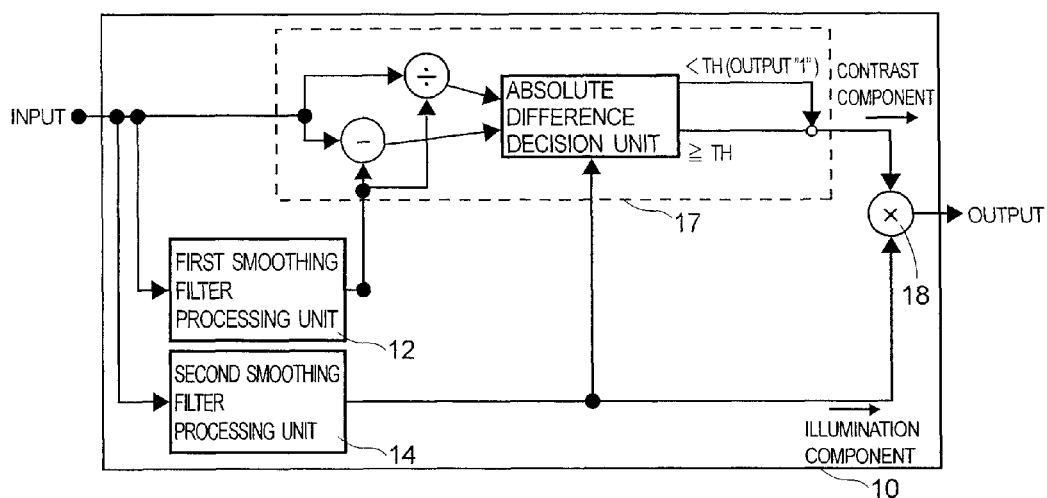
FIG. 22 is a block diagram of the picture processing apparatus according to a second modification of the tenth embodiment.

As shown in FIG. 22, the tenth embodiment may be applied to the block diagram of FIG. 19 of embodiment 6-2. Briefly, the second smoothing filter processing unit 14 is added to the block diagram of FIG. 19 of embodiment 6-2.

(The Eleventh Embodiment)

Figure 14:
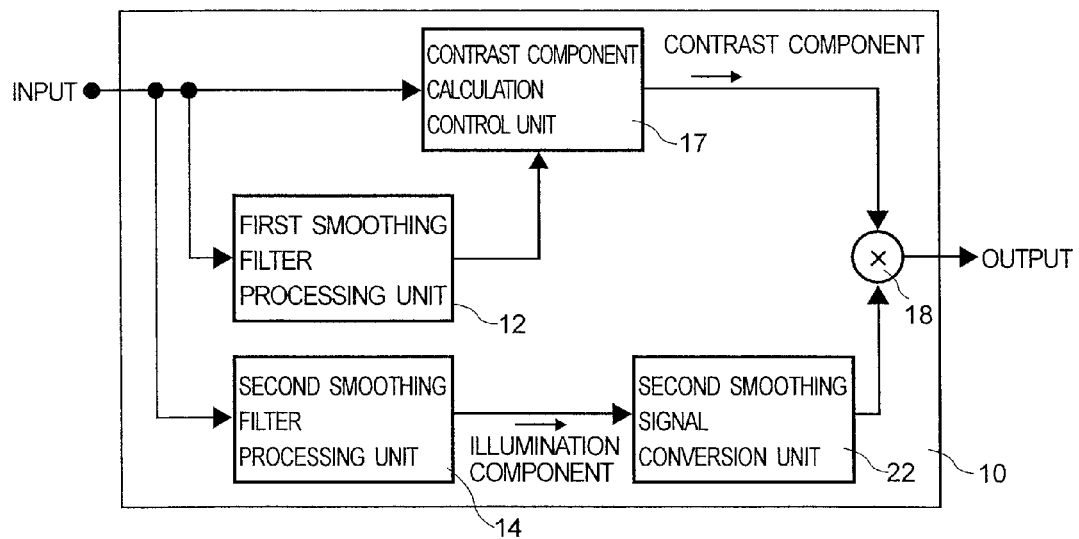
FIG. 14 is a block diagram of the picture processing apparatus according to an eleventh embodiment.

The eleventh embodiment relates to level conversion of an illumination component, which is explained by referring to FIG. 14. In the eleventh embodiment, level conversion processing of the illumination component is applied to the seventh embodiment. In the same way as the seventh embodiment, the eleventh embodiment can be applied to the first, second, third, sixth, and tenth embodiments.

FIG. 14 is a block diagram of the picture processing apparatus 10 according to the eleventh embodiment. The picture processing apparatus 10 includes the first smoothing filter processing unit 12, the second smoothing filter processing unit 14, the contrast component calculation control unit 17, the image composition unit 18, and a second smoothing signal conversion unit 22.

As shown in FIG. 14, an output signal from the contrast component calculation control unit 17 is a contrast component, and an output signal from the second smoothing filter processing unit 14 is an illumination component.

In the eleventh embodiment, the second smoothing signal conversion unit 22 for converting (enhancement/compression) a level of the second smoothing signal (illumination component signal) from the second smoothing filter processing unit 14 is added to the seventh embodiment.

By conversing the level at the second smoothing signal conversion unit 22, an output picture has a compressed dynamic range and a brightly converted dark area. For example, in case of compressing the dynamic range, the second smoothing signal conversion unit 22 compresses the illumination element signal. Furthermore, in case of brightly converting the dark area, a level of the dark area is converted as a bright area.

(The Twelfth Embodiment)

Figure 15:
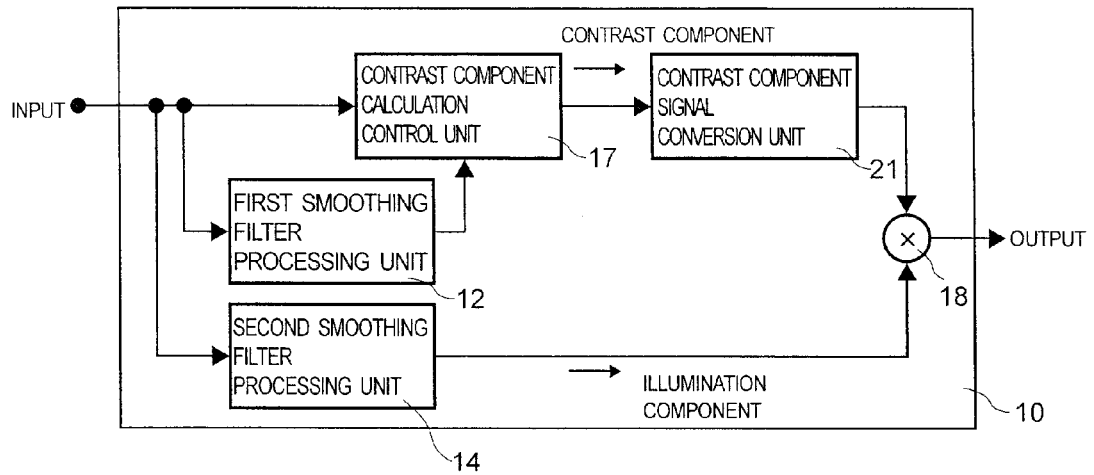
FIG. 15 is a block diagram of the picture processing apparatus according to a twelfth embodiment.

The twelfth embodiment relates to level conversion of a contrast component, which is explained by referring to FIG. 15. In the twelfth embodiment, level conversion processing of the contrast component is applied to the seventh embodiment. In the same way as in the seventh embodiment, the twelfth embodiment can be applied to the first, second, third, sixth, and tenth embodiments.

FIG. 15 is a block diagram of the picture processing apparatus 10 according to the twelfth embodiment. The picture processing apparatus 10 includes the first smoothing filter processing unit 12, the second smoothing filter processing unit 14, the contrast component calculation control unit 17, the image composition unit 18, and a contrast component signal conversion unit 21.

As shown in FIG. 15, an output signal from the contrast component calculation control unit 17 is a contrast component, and an output signal from the second smoothing filter processing unit 14 is an illumination component.

In the twelfth embodiment, the contrast component signal conversion unit 21 for converting (enhancement/compression) a level of a contrast component signal (from the contrast component calculation control unit 17) is added to the seventh embodiment.

By converting a signal level at the contrast component signal conversion unit 21, a contrast (for example, an edge or a texture) in the picture is enhanced or compressed. Furthermore, a noise in the picture is reduced. For example, in case of enhancing the contrast, the contrast component signal conversion unit 21 enhances the contrast component. Furthermore, in case of lowering the contrast or reducing the noise in the picture, the contrast component is compressed.

As an example method for enhancing/compressing a contrast component, for example, in case of enhancing the contrast component, the contrast component is squared. In case of compressing the contrast component, a square root of the contrast component is calculated. As another method, in case of enhancing the contrast component, a value above "1" is multiplied with the contrast component. In case of compressing the contrast component, a value below "1" is multiplied with the contrast component.

(The Thirteenth Embodiment)

Figure 16:
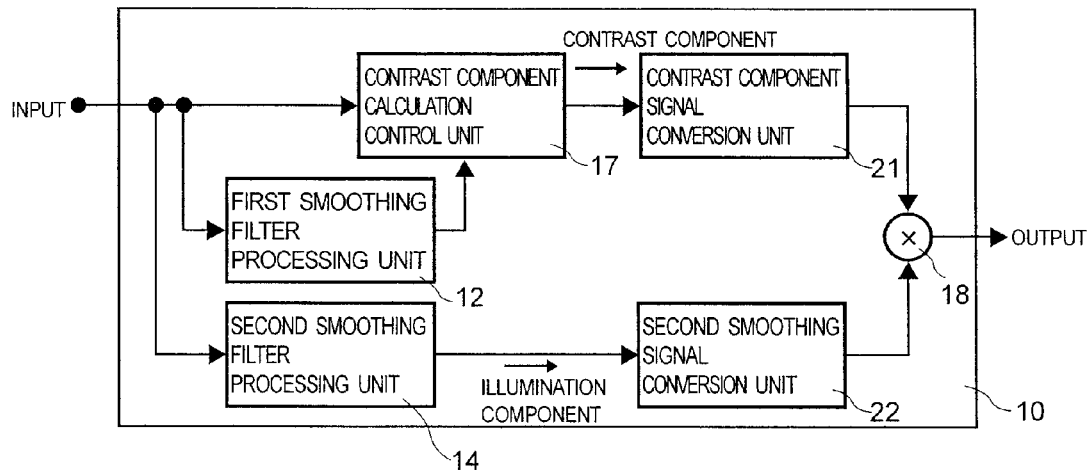
FIG. 16 is a block diagram of the picture processing apparatus according to a thirteenth embodiment.

The thirteenth embodiment relates to level conversion of an illumination component and a contrast component, which is explained by referring to FIG. 16. In the thirteenth embodiment, a signal conversion processing of the illumination component and the contrast component is applied to the seventh embodiment. In the same way as the seventh embodiment, the twelfth embodiment can be applied to the first, second, third, sixth, and tenth embodiments.

FIG. 16 is a block diagram of the picture processing apparatus 10 according to the thirteenth embodiment. The picture processing apparatus 10 includes the first smoothing filter processing unit 12, the second smoothing filter processing unit 14, the contrast component calculation control unit 17, the image composition unit 18, the contrast component signal conversion unit 21, and the second smoothing signal conversion unit 22.

As shown in FIG. 16, an output signal from the contrast component calculation control unit 17 is a contrast component, and an output signal from the second smoothing filter processing unit 14 is an illumination component.

In the thirteenth embodiment, in addition to the seventh embodiment, the second smoothing signal conversion unit 22 (of the eleventh embodiment) and the contrast component signal conversion unit 21 (of the twelfth embodiment) are added. Accordingly, by compressing the illumination component and enhancing the contrast component, an output picture has a compressed dynamic range and an enhanced contrast (For example, an edge or a texture).

In the disclosed embodiments, the processing can be accomplished by a computer-executable program, and this program can be realized in a computer-readable memory device.

In the embodiments, the memory device, such as a magnetic disk, a flexible disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for processing a picture, the apparatus being a computer coupled to a memory, comprising:
  a first smoothing filter configured to generate a first smoothed picture by smoothing a brightness component of an input picture;
  an adjustment filter configured to generate an adjusted picture by applying a filter to an area of the input picture if the area has a brightness lower than a threshold, the filter having the same characteristic as the first smoothing filter, and by outputting the area as it is if the area has a brightness higher than the threshold;
  a contrast component calculation unit configured to calculate a contrast component of the input picture by dividing each pixel value of the adjusted picture with a corresponding pixel value of the first smoothed picture; and
  an output picture generation unit configured to generate an output picture by multiplying the first smoothed picture with the contrast component.

2. An apparatus for processing a picture, the apparatus being a computer coupled to a memory, comprising:
  a first smoothing filter configured to generate a first smoothed picture by smoothing a brightness component of an input picture and by not preserving an edge component of the input picture;
  an adjustment filter configured to generate an adjusted picture by applying a filter to an area of the input picture if the area has a brightness lower than a threshold, the filter having the same characteristic as the first smoothing filter, and by outputting the area as it is if the area has a brightness higher than the threshold;

a contrast component calculation unit configured to calculate a contrast component of the input picture by dividing each pixel value of the adjusted picture with a corresponding pixel value of the first smoothed picture; and a second smoothing filter configured to generate a second smoothed picture by smoothing the brightness component of the input picture and by preserving the edge component of the input image; and an output picture generation unit configured to generate an output picture by multiplying the second smoothed picture with the contrast component.

3. An apparatus for processing a picture, the apparatus being a computer coupled to a memory, comprising:

a first smoothing filter configured to generate a first smoothed signal by smoothing a brightness of an area of an input picture;

an adjustment filter configured to generate an adjusted signal by maintaining the brightness of the area if the brightness is not within a range of a predetermined brightness, and by replacing the brightness of the area with the predetermined brightness if the brightness is within the range;

a contrast component calculation unit configured to calculate a contrast component of the input picture by dividing the input picture with the adjusted signal; and a picture composition unit configured to generate a composed picture by multiplying the first smoothing signal with the contrast component.

4. An apparatus for processing a picture, the apparatus being a computer coupled to a memory, comprising:

a first smoothing filter configured to generate a first smoothed signal by smoothing a brightness of an area of an input picture;

a contrast component calculation control unit configured to compare an absolute difference between the brightness of the area of the input picture and a brightness of the area of the first smoothing signal, and to generate an adjustment contrast component by dividing the brightness of the input picture with the brightness of the first smoothed signal if the absolute difference is above a threshold, and to generate an adjustment contrast component "1" if the absolute difference is not above the threshold; and a picture composition unit configured to generate a composed picture by multiplying the first smoothed signal with the adjustment contrast component.

5. An apparatus for processing a picture, the apparatus being a computer coupled to a memory, comprising:

a first smoothing filter configured to generate a first smoothed signal by smoothing a brightness of an area of an input picture without preserving an edge component;

a contrast component calculation control unit configured to compare an absolute difference between the brightness of the area of the input picture and a brightness of the area of the first smoothing signal, and to generate an adjustment contrast component by dividing the brightness of the input picture with the brightness of the first smoothed signal if the absolute difference is above a threshold, and to generate an adjustment contrast component "1" if the absolute difference is not above the threshold;

a second smoothing filter configured to generate a second smoothed signal by smoothing the brightness of the area of the input picture while preserving the edge component; and a picture composition unit configured to generate a composed picture by multiplying the second smoothing signal with the adjustment contrast component.

6. The apparatus according to anyone of claims 4 and 5, wherein the contrast component calculation control unit raises the threshold if the brightness of each area of the input picture is lower than a reference value.

7. The apparatus according to anyone of claims 4 and 5, wherein the contrast component calculation control unit raises the threshold for the lower brightness of each area of the input picture.

8. The apparatus according to claim 4, further comprising a second smoothing filter configured to generate a second smoothed signal by smoothing the brightness of the area of the input picture while preserving the edge component;

wherein the contrast component calculation control unit raises the threshold if the brightness of the area of the input picture is lower than a reference value.

9. The apparatus according to claim 4, further comprising a second smoothing filter configured to generate a second smoothed signal by smoothing the brightness of each area of the input picture while preserving the edge component;

wherein the contrast component calculation control unit raises the threshold for the lower brightness of each area of the input picture.

10. The apparatus according to anyone of claims 1, 2, 3, 4, and 5, further comprising a conversion processing unit configured to execute enhancement processing or compression processing to the second smoothing signal, the contrast component, or the adjustment contrast component.

* * * * *